(12) United States Patent
Norum

(10) Patent No.: US 10,703,648 B2
(45) Date of Patent: Jul. 7, 2020

(54) HYDROCYCLONE AND METHOD TO REMOVE PARTICLES FROM LIQUID STREAMS

(71) Applicant: California State University Fresno, Fresno, CA (US)

(72) Inventor: Edward Norum, Fresno, CA (US)

(73) Assignee: California State University, Fresno, Long Beach, CA (US)

( * ) Notice: Subject to any disclaimer, the term of this patent is extended or adjusted under 35 U.S.C. 154(b) by 571 days.

(21) Appl. No.: 14/987,647

(22) Filed: Jan. 4, 2016

(65) Prior Publication Data

US 2017/0190599 A1    Jul. 6, 2017

(51) Int. Cl.

| C02F 1/38 | (2006.01) |
|---|---|
| B01D 21/26 | (2006.01) |
| B04C 5/08 | (2006.01) |
| A01G 25/02 | (2006.01) |
| E02B 13/00 | (2006.01) |

(Continued)

(52) U.S. Cl.
CPC .............. *C02F 1/38* (2013.01); *B01D 21/267* (2013.01); *B04C 5/081* (2013.01); *E02B 13/00* (2013.01); *A01G 25/02* (2013.01); *B04C 2003/003* (2013.01); *Y02A 40/237* (2018.01)

(58) Field of Classification Search
CPC . C02F 1/48; C02F 1/38; B01D 21/267; B01D 17/0217; B01D 21/26; B01D 21/265; B04C 5/081; B04C 2003/003; B04C 3/00; B04C 3/06; B04C 5/08; B04C 5/107; B04C 5/13; B04C 2003/006; B04C 2005/133; B04C 2005/136; B04C 2009/004; Y02A 40/237; A01G 25/02; A01G 25/00; A01G 25/023; A01G 25/026; A01G 25/06;

(Continued)

(56) References Cited

U.S. PATENT DOCUMENTS

| 453,105 A * | 5/1891 | Bretney | ................. B04C 5/081 |
|---|---|---|---|
| | | | 210/512.1 |
| 2,724,503 A * | 11/1955 | Fontein | ................. B04C 5/081 |
| | | | 209/727 |

(Continued)

OTHER PUBLICATIONS

Vladimirovic et al, Derwent translated abstract of Russian Patent publication, RU 2346427, Published Feb. 20, 2009. (Year: 2009).*

*Primary Examiner* — Joseph W Drodge
(74) *Attorney, Agent, or Firm* — Schwegman Lundberg & Woessner, P.A.

(57) ABSTRACT

This invention is directed to a hydrocyclone that will separate particles from a liquid stream, such as from an irrigation water stream for use in drip irrigation. The invented hydrocyclone has an inlet, a separation section, a clean liquid outlet, and a slurry outlet, wherein the separation section has a vortex and a cone, and wherein the vortex length is more than three times longer than the cone length, and the cone has an angle of about 45 degrees. The invented hydrocyclone also has a vortex diameter to vortex length ratio of between about 0.8 and about 1.2, and a cone length to vortex length ratio of between about 0.28 and about 0.35. The invented hydrocylone may be of unitary construction. When in use, the invented hydrocyclone may create a clean water stream having at least 78% fewer particles than the original liquid stream.

8 Claims, 2 Drawing Sheets

(51) Int. Cl.
*B04C 5/081* (2006.01)
*B04C 3/00* (2006.01)

(58) Field of Classification Search
CPC ...... A01G 2025/006; D21D 5/24; B03B 5/32; B03B 5/34; E02B 13/00
USPC ............ 210/512.1, 512.2, 512.3, 788; 209/713–722, 725–734; 55/459.1–460; 96/209–213; 47/48.5; 405/36, 39, 43, 405/45, 50, 51
See application file for complete search history.

(56) References Cited

U.S. PATENT DOCUMENTS

| | | | | |
|---|---|---|---|---|
| 2,819,795 A * | 1/1958 | Dijksman | ................ | B04C 5/04 209/732 |
| 3,172,844 A * | 3/1965 | Kurz | ................ | B04C 1/00 209/210 |
| 3,389,793 A * | 6/1968 | Leeman | ................ | B04C 5/081 209/727 |
| 3,802,570 A * | 4/1974 | Dehne | ................ | B04C 5/14 210/304 |
| 3,876,155 A * | 4/1975 | Ruben | ................ | A01G 25/023 239/542 |
| 3,887,456 A * | 6/1975 | Loughner | ................ | B04C 5/081 209/732 |
| 4,159,073 A * | 6/1979 | Liller | ................ | B04C 5/02 138/39 |
| 4,235,363 A * | 11/1980 | Liller | ................ | B04C 5/081 209/732 |
| 4,317,716 A * | 3/1982 | Liller | ................ | B03B 9/005 209/484 |
| 4,710,284 A * | 12/1987 | Amit | ................ | A01C 23/042 209/156 |
| 5,236,130 A * | 8/1993 | Hadar | ................ | A01G 25/023 239/542 |
| 5,667,686 A | 9/1997 | Schubert | | |
| 7,293,657 B1 | 11/2007 | Kelton et al. | | |
| 2006/0175234 A1* | 8/2006 | Kim | ................ | B04C 5/081 209/727 |
| 2007/0215541 A1 | 9/2007 | Kampfera | | |

* cited by examiner

HYDROCYCLONE AND METHOD TO REMOVE PARTICLES FROM LIQUID STREAMS

BACKGROUND

1. Field of the Invention

The invention is directed to hydrocyclones that separate particles from the liquid streams that carry them, such as from water streams used for drip irrigation.

2. Related Prior Art

Drip irrigation is a very efficient method of applying water and nutrients to crops. Lower-volume water sources can be used because drip irrigation may require less than half of the water needed for sprinkler or flood irrigation. Lower operating pressures mean reduced energy costs for pumping. High levels of water-use efficiency are achieved because plants can be supplied with more precise amounts of water. A drip irrigation system has three different pipelines: (1) mainline to convey water from main source, (2) sub-mainline (or header) to convey water from mainline, and (3) drip lines that connect to the sub-mainlines to deliver water through emitters to where the water is needed.

A. Methods and Devices to Keep Debris Out of Drip Irrigation Systems

Drip irrigation systems must deliver water through the pipelines to plants. Therefore, debris that may clog the lines must be kept out of the drip irrigation system or the plants will not receive the adequate amount of water. The particles that are found in irrigation streams can be heavier than water-particles having a specific gravity greater than 1.0. Particles found in an irrigation stream can also be lighter than water-particles having a specific gravity less than 1.0. Also, particles come in different sizes, with some being smaller than others.

There are different methods and devices to keep debris and particles out of the drip irrigation system, particularly out of the drip lines. Each different method and device is optimized to separate out particles of certain sizes or certain specific gravities from the liquid stream. Some techniques and devices to keep debris and particles out of the drip irrigation system include: media filters, sand separators, screen filters, and disk filters.

Media filters are the most common filters used in commercial vegetable production. Media filters filter out particles by size. Ranging from 14 inches to 48 inches in diameter, they are usually installed in pairs. Media filters are expensive, heavy, and large, but they can clean poor-quality water at high flow rates. As the media fills with particulate matter, the pressure drop across the media tank increases, forcing water through smaller and fewer channels. This will eventually disable a media filter, requiring that clean water from one tank be routed backwards through the dirty tank to clean the media.

Like media filters, screen filters are used widely in commercial vegetable production and filter particles by size. Screen filters are the most common irrigation filter used by small operations if the water source is relatively clean. Screen filters can remove debris efficiently like a media filter, but they are not capable of removing as much debris as a media filter before cleaning is required. Compared to media filters, screen filters are often oversized because they only have a relatively small, two-dimensional cleaning surface. Regular cleaning of screen filters is very important.

If they are neglected, a portion of the screening element will become caked and clogged, forcing water through a smaller area, pushing debris through the screening element and at ever increasing energy losses—under extreme conditions—rupturing it.

Disk filters are devices that possess traits of both media and screen filters. Disk filters also filter particles by size. The screening element of a disk filter consists of stacks of thin, doughnut-shaped, grooved disks. The stack of disks forms a cylinder where water moves from the outside of the cylinder to its core. Like a media filter, the action of the disk filter is three dimensional. Debris is trapped on the cylinder's surface while also moving a short distance into the cylinder, increasing the capacity of the disk filter. Cleaning a disk filter requires removing the disk cylinder, expanding the cylinder stack to loosen the disks, and using pressurized water to spray the disks clean. Although disk filters have a cleaning capacity between media and screen filters, disk filters are not recommended where organic matter or sand load is high.

Unlike filters, sand separators separate particulate matter by specific gravity by swirling the incoming liquid stream through a vortex and separating out the particles from the water. Sand separators must be sized according to the flow rate to operate properly.

B. Hydrocyclones

Like a sand separator, a hydrocyclone device separates out debris and particles from a liquid stream on the basis of specific gravity. A hydrocyclone is a device that classifies and separates particles suspended in liquid based on the ratio of their centrifugal force to fluid resistance. This ratio is high for high specific gravity and coarse particles, and low for low specific gravity and fine particles. A hydrocyclone will normally have a cylindrical section at the top where liquid is being fed tangentially, and a conical base. Current hydrocyclones collect particles in the conical base, requiring regular cleaning to keep the hydrocyclone functioning effectively.

What is needed is an effective method and device to keep drip irrigation systems clear of debris requiring little maintenance and little energy.

SUMMARY

This invention is directed to a hydrocyclone for separating particles from a liquid stream, comprising an inlet, a vortex having a length, a cone having a length and an angle, a clean liquid outlet, and a slurry outlet, wherein the vortex length is more than three times longer than the cone length, and the cone angle is about 45 degrees. The hydrocyclone may be of unitary construction.

In another aspect, the invention is directed to a method of separating particles from a liquid stream comprising: creating a hydrocyclone having an inlet, a separation section, a clean liquid outlet, and a slurry outlet, wherein the separation section has a vortex having a length and a cone having a length, and wherein the vortex length is longer than the cone length; creating a pressure within the separation section; directing a stream of liquid into the inlet; ensuring the liquid stream is circulated through the separation section, wherein the liquid stream is separated into a clean stream and a slurry stream by the pressure; guiding the clean stream towards and out of the clean liquid outlet; and disposing the slurry stream out of the slurry outlet.

The separation section in the method described above may further comprise a clean liquid separation zone, and a slurry separation zone. The vortex may have a diameter and a length, and the ratio of the vortex diameter to the vortex length may be between about 0.8 and about 1.2. The vortex may have a vortex arm having a length and a vortex base having a length, and the ratio of the arm length to the base length may be between about 2 and about 4. The cone in the method described above may be angled between about 45 degrees and about 50 degrees. The ratio of the cone length to the vortex length may be between about 0.28 and about 0.35. The cone may have a wide diameter, and the ratio of the wide diameter to the cone length may be between about 3.1 and about 3.2.

In another aspect of the invented method, the stream of liquid has a first particle amount, and the clean stream has a second particle amount, and the second particle amount is at least 78% less than the first particle amount.

DETAILED DESCRIPTION OF THE PREFERRED EMBODIMENTS

Irrigation streams in the Central California agriculture areas often have dust particles and other particles in water streams. These dust particles and other particles are very difficult to separate out from water streams. This can cause the water used for irrigation, industry, and swimming pools to contain unwanted particles. One purpose of the invented micro cyclone, or hydrocyclone, is to remove these dust particles—as well as any larger particles—out of water streams so the water used for irrigation, industry and swimming pools can be cleaner. In one embodiment, the invented hydrocyclone separates particles from water streams so that irrigation drip lines do not get clogged during usage.

A. Design of Invented Hydrocyclone

Figure 1:
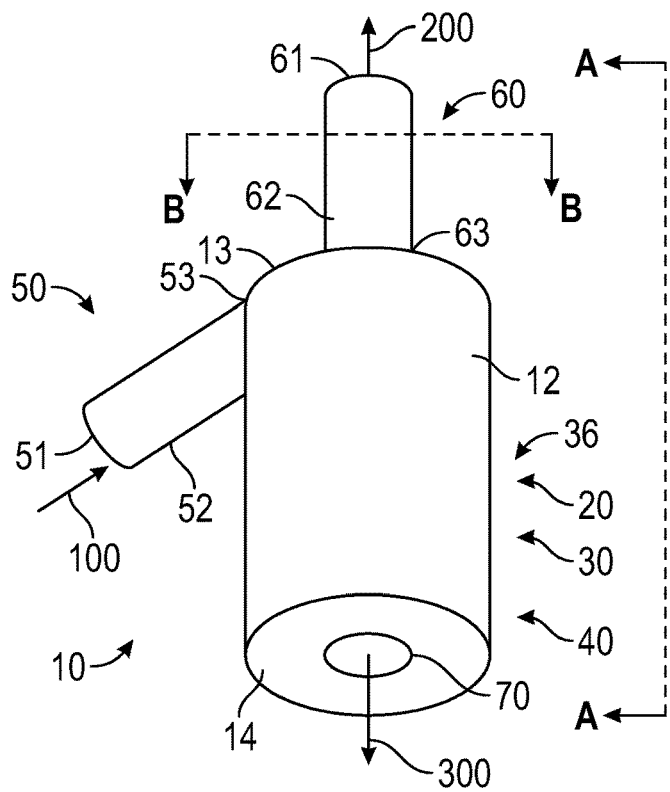
FIG. 1 shows a perspective view of the hydrocyclone

As shown in FIG. 1, the invented hydrocyclone 10 has outer cylindrical body 12, inlet 50, clean liquid outlet 60, and slurry outlet 70. Hydrocyclone 10 has front surface 13 and back surface 14. Hydrocyclone 10 is divided into different sections: vortex 20, cone 30, and slurry separation zone 40. Together, vortex 20 and cone 30 form separation zone 36. Inlet 50 has inlet opening 51 to receive an incoming liquid stream, inlet body portion 52, and inlet connection 53 to connect to separation zone 36. In one embodiment, inlet connection 53 connects to vortex 20. Clean liquid outlet 60 has outlet opening 61 to release the processed water, outlet body portion 62, and outlet connection 63 to connect to front surface 13. Slurry outlet 70 is located on back surface 14, and releases the particles, sediment, and dust that are separated away from the clean liquid.

Figure 2:
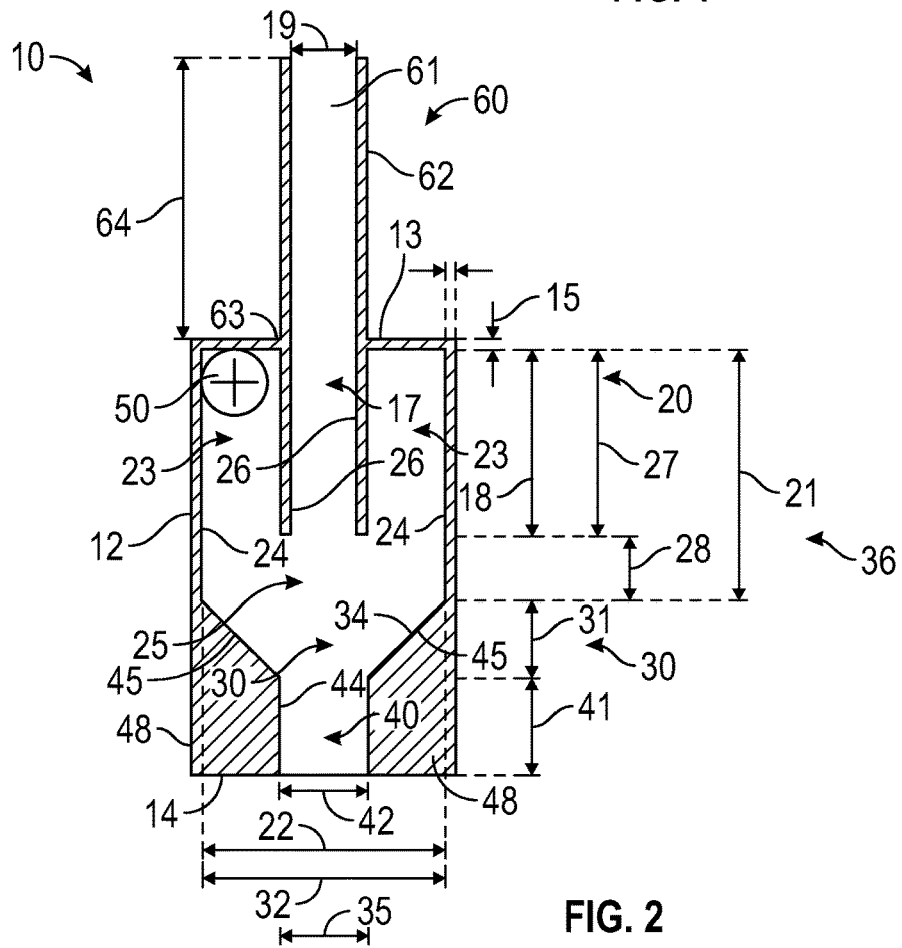
FIG. 2 shows a cross-section of the hydrocyclone along the line A-A, as shown in FIG. 1.

As shown in FIG. 2, hydrocyclone 10 has many sections, all with precise dimensions to effectively filter out particles, sediment, and dust from the liquid stream. Separation zone 36 is made up of two distinct sections: vortex 20 and cone 30. Vortex 20 has vortex length 21 and vortex diameter 22. In one embodiment, vortex length 21 may be between about 1.2 inches and about 1.5 inches, and may be specifically about 1.364 inches. Vortex diameter 22 may be between about 1.32 inches and about 1.42 inches, and may be specifically about 1.375 inches. Ratio of vortex diameter 22 to vortex length 21 may be between about 0.8 and about 1.2, more specifically may be between about 0.9 and 1.1, and may be most specifically about 1.

Also shown in FIG. 2, vortex 20 has vortex arm 23 and vortex base 25. Vortex arm 23 may have arm length 27, and vortex base may have base length 28. Arm length 27 may be between about 0.9 inches and about 1.2 inches, and may be specifically about 0.989 inches. Base length 28 may be between about 0.3 inches and about 0.4 inches, and may be specifically about 0.375 inches. The ratio of arm length 27 to base length 28 may be between about 1 and about 5, more specifically may be between about 2 and 4, and most specifically may be about 2.6. The sum of arm length 27 and base length 28 should equal vortex length 21.

Clean separation zone 17 is situated in the middle of vortex 20, but physically separated from vortex arm 23 by separation barrier 26. Clean separation zone 17 has clean separation length 18 and clean separation diameter 19. In one embodiment, clean separation length 18 may be between about 0.8 inches and about 1.2 inches, and may be specifically about 0.989 inches. Clean separation diameter 19 may be between about 0.3 inches and about 0.4 inches, and may be specifically about 0.375 inches. Clean separation zone 17 leads into clean liquid outlet 60, up outlet body 62, along outlet length 64, out outlet opening 61.

Continuing with FIG. 2, cone 30 has cone length 31, cone wide diameter 32, and cone narrow diameter 35. Cone 30 forms angle 45 with respect to outer cylindrical body 12. Angle 45 may be between about 40 degrees and about 50 degrees, and may be specifically about 45 degrees. In one embodiment, cone length 31 may be between about 0.4 inches and about 0.5 inches, and may be specifically about 0.438 inches. Cone wide diameter 32 may be between about 1.32 inches and about 1.42 inches, and may be specifically 1.375 inches. Cone narrow diameter 35 may be between about 0.4 inches and about 0.6 inches, and may be specifically about 0.5 inches. The diameter of cone wide diameter 32 to cone length 31 may be between 3.1 and 3.2, and may be specifically about 3.14.

Between cone 30 and slurry outlet 70 is slurry separation zone 40. Slurry separation zone 40 has slurry zone length 41 and slurry zone diameter 42. Slurry zone length 41 may be between about 0.5 inches and 0.6 inches, and may be specifically about 0.563 inches. Slurry zone diameter 42 may be between about 0.4 inches and about 0.6 inches, and may be specifically about 0.5 inches. The ratio of slurry zone diameter to slurry zone length may be between about 0.85 and 0.92, and may be specifically about 0.89.

Still continuing with FIG. 2, hydrocyclone 10 can be made of unitary construction by being printed from a three-dimensional printer, such as a PolyJet 3D printer, or may be cast as a unitary piece from a mold. PolyJet 3D printing is similar to inkjet printing, but instead of jetting drops of ink onto paper, PolyJet 3D Printers jet layers of curable liquid photopolymer onto a build tray. The process can be described in these three steps:

(1) Pre-processing—Build-preparation software automatically calculates the placement of photopolymers and support material from a 3D CAD file.

(2) Production—The 3D printer jets and instantly UV-cures tiny droplets of liquid photopolymer. Fine layers accumulate on the build tray to create a precise 3D model or part. Where overhangs or complex shapes require support, the 3D printer jets a removable gel-like support material.

(3) Support removal: The user easily removes the support materials by hand or with water. Models and parts are ready to handle and use right out of the 3D printer, with no post-curing needed.

As shown in FIG. 1 and FIG. 2, hydrocyclone 10 has outer cylindrical surface 12, outer wall 16, front wall 15, inlet 50, and clean liquid outlet 60. Flanges 48 define cone 30, slurry separation zone 40, and slurry outlet 70. In one embodiment, front wall 15 may measure between about 0.05 inches and 0.2 inches in thickness, and may measure specifically 0.136 inches in thickness. Outer wall 16 may measure between about 0.05 inches and 0.2 inches in thickness, and may measure specifically 0.136 inches in thickness. Separation barrier 26 may measure between about 0.05 inches and 0.2 inches in thickness, and may measure specifically 0.136 inches in thickness. In one embodiment, clean liquid outlet 60 may have a wall that measures the same thickness as separation barrier 26. Clean liquid outlet 60 connects to clean separation zone 17 by outlet connection 63, located on front surface 13.

Figure 3:
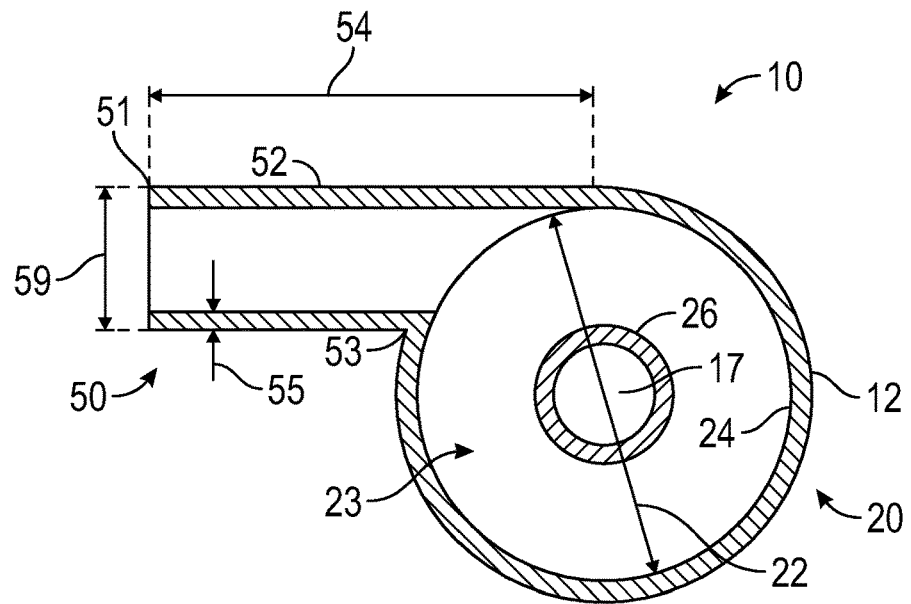
FIG. 3 shows a cross-section of the hydrocyclone along the line B-B, as shown in FIG. 1.

As shown in FIGS. 2 and 3, inlet 50 connects to separation zone 36, specifically inlet 50 connects to vortex 20 via inlet connection 53. Inlet 50 has inlet length 54—as measured from inlet opening 51 to center of the axis of vortex 20—and inlet diameter 59. As shown in FIG. 3, inlet 50 can be situated to connect to vortex 20 such that the incoming liquid stream 200 circles clockwise through vortex 20, around and along vortex arm 23, directed by vortex surface 24. In one embodiment, inlet length 54 may be between about 1.55 inches and about 1.75 inches, and may be specifically about 1.625 inches. Inlet diameter 59 may be between about 0.4 inches and about 0.6 inches, and may be specifically about 0.5 inches.

Figure 4:
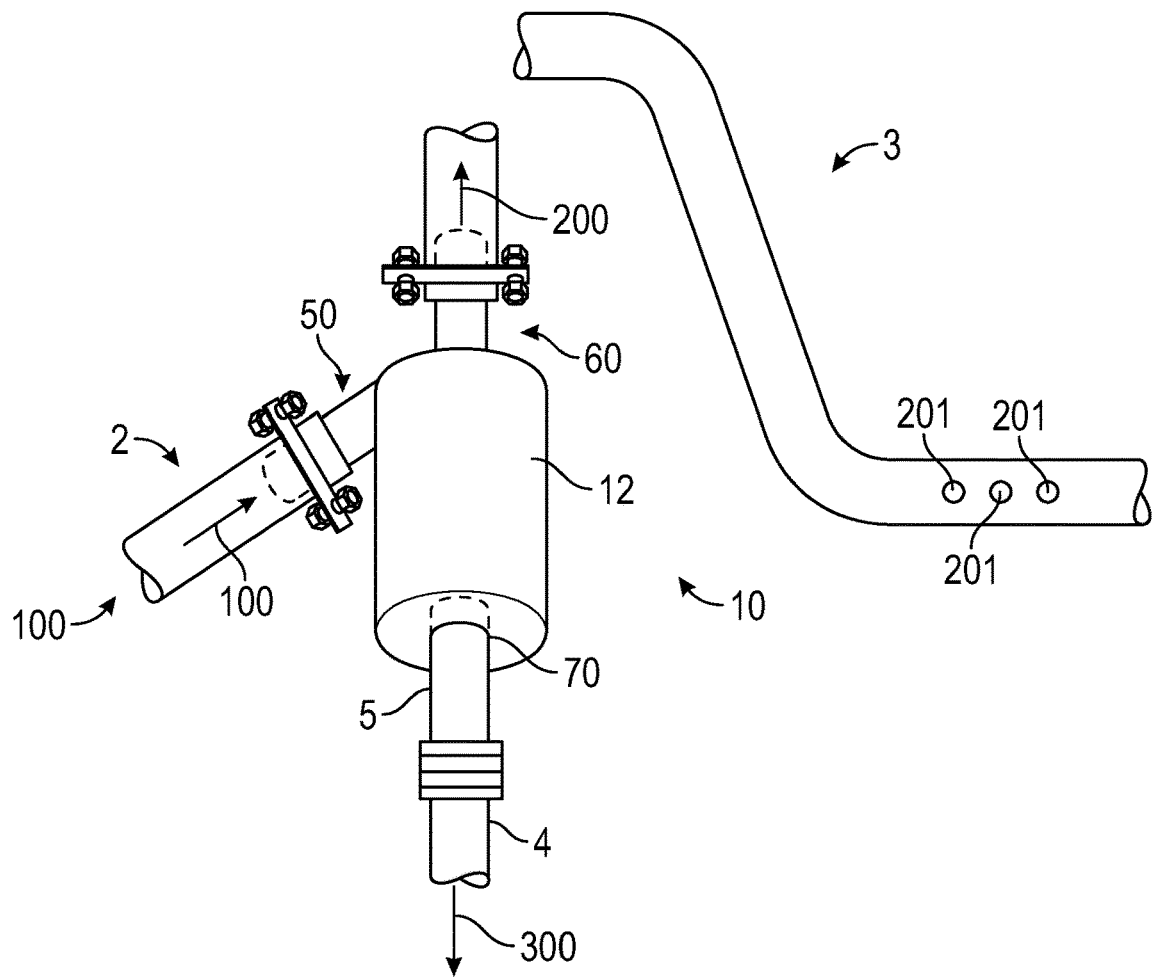
FIG. 4 shows a perspective view of the hydrocyclone with the inlet connected to a drip irrigation sub-mainline, the clean liquid outlet connected to a drip line, and the slurry outlet connected to an emitter.

B. Method of Separating Particles from Liquid Stream Using Invented Hydrocyclone As shown in FIGS. 1-4, hydrocyclone 10 may be used to separate particles from a liquid stream by connecting a liquid supply line to inlet 50, and by connecting an emitter to slurry outlet 40. The liquid supply line delivers a supply of pressurized liquid to be processed through hydrocyclone 10. The liquid supply line must be pressurized to force the liquid through hydrocyclone 10. Together, emitter coupling tube 5 along with emitter 4 exert a pressure—referred to in the art as "back pressure"—on the liquid stream within hydrocyclone 10, and regulates the flow rate of the disposed slurry stream. Together, the liquid supply line and the emitter create a back pressure within separation section 36. As shown in FIG. 4, the flow rate through hydrocyclone 10 is determined by the hydraulic properties and number of emitters connected to drip streams 201 on drip line 3. The flow rate described above determines the separation efficiency of hydrocyclone 10.

An emitter is broadly described as any device that creates a controlled and predictable flow. In one embodiment, the emitter may be a slurry line emitter from OreMax, and may be a 1 gallon per hour emitter. The continuously purging flow created by the emitter is determined by the emitter design.

As shown in FIG. 1 and FIG. 4, inlet 50 may be connected and secured to sub-main line 2, such as a layflat supply manifold, such as a Cobco Poly-Piple lay-flat flexible tubing. In one embodiment, sub-main line 2 may fit over inlet 50, and a clamp may hold sub-main line 1 securely in place on inlet 50. Sub-main line 2 delivers pressurized liquid stream 100, such as an irrigation water stream, into separation zone 36. Drip line 3 may be connected to and secured to clean liquid outlet 60. In one embodiment, drip line 3 may be from DripWorks, and may be a polyethylene tubing measuring either 0.25 inches in diameter, or 0.5 inches in diameter. In one embodiment, drip line 3 may fit over clean liquid outlet 60, and a clamp may hold drip line 3 securely in place on clean liquid outlet 60. Clean stream 200 may then be diverted into drip streams 201 to be dispensed to plants. In one embodiment, drip streams 201 may be dispensed through emitters, such as Jain Button Emitters.

Also as shown in FIGS. 2 and 4, slurry outlet 70 may be connected and secured to emitter 4. In one embodiment, emitter coupling tube 5 may be inserted into slurry separation zone 40, and the emitter coupling tube 5 may be screwed to emitter 4. Slurry stream 300 exits slurry separation zone 40 out of slurry outlet 70 and enters into, passes through, and exits emitter 4. Emitter 4 works with sub-main line 2 to create back pressure within hydroclone 10.

As shown in FIGS. 1 and 4, a liquid stream 100 is delivered by sub-main line 2 into hydrocyclone 10 through inlet 50, specifically through inlet opening 51, and is directed along inlet body portion 52 into separation zone 36, first through vortex 20 and then through cone 30. When hydrocyclone 10 is in use, liquid stream 100 is directed through vortex 20 and cone 30 and separated into clean stream 200 and slurry stream 300. Clean stream 200 exits clean liquid outlet 60 along outlet body portion 62 and out outlet opening 61. Slurry stream 300 exits slurry outlet 70. Clean stream 200 is delivered to drip line 3 and subsequently to drip streams 201, which each may be controlled by a drip line emitter. The number of drip line emitters controlling drip streams 201 automatically fixes the flow rate critical to achieving maximum separation efficiency from hydrocyclone 10.

As shown in FIGS. 2 and 3, vortex surface 24 directs liquid stream 100 in a circular pattern along vortex arm 23. Once in vortex 20, irrigation stream 100 is directed by vortex surface 24 and separation barrier 25 in a clockwise direction around vortex arm 23, down to vortex base 25. The circular pattern of the liquid stream within vortex 20 creates centrifugal force on liquid stream 100, thereby forcing the particles, sediment and dust outwardly toward vortex surface 24. Unlike the particles, sediment and dust forced outwardly by the created centrifugal force, the liquid containing fewer particles, sediment and dust remains closer to the axis of vortex 20. At vortex base 25, the pressure created by sub-main line 2 and emitter 4 within hydrocyclone 10 forces the liquid containing fewer particles, sediment and dust from an area of higher pressure—vortex base 25—into an area of lower pressure—clean separation zone 17. The liquid forced into clean separation zone 17 is defined as clean stream 200.

Continuing with FIGS. 2 and 3, once in vortex base 25, the particles, sediment and dust forced by centrifugal force outwardly towards vortex surface 24 will continue to travel along vortex surface 24 towards cone 30. Once within cone 30, cone surface 34 guides the particles, sediment and dust toward slurry separation zone 40. Once in slurry separation zone 40, the particles, sediment and dust become slurry stream 300. Slurry stream 300 progresses from slurry separation zone 40 and out slurry outlet 70, guided by slurry zone surface 44. Slurry stream 300 exits hydrocyclone 10 out of slurry outlet 70 and into emitter 4. Slurry stream 300 eventually also exits emitter 4.

Slurry separation zone 40 is situated between cone 30 and slurry outlet 70. The role of slurry separation zone 40 is to sequester the separated particles, sediment and dust in a sheltered location so the transient turbulence does not lift them back into vortex base 25 and deliver them to clean separation zone 17.

Also as shown in FIG. 4, slurry stream 300 may be dispensed by slurry outlet 70 into emitter 4. Ultimately slurry stream 300 will be disposed out of emitter 4 and in the field.

Example 1: Hydrocyclone is Effective at Removing Small Particles from Irrigation Water For the hydrocyclone 10 assembly in this example, the sub-main line 2 connection was Cobco Poly-Pipe lay-flat flexible polyethylene tubing measuring 0.5 inch in diameter. Also, emitter 4 was an OreMax 1.0 gallon per hour emitter. The emitter coupling tube 5 was Cobco Poly-Pipe lay-flat flexible polyethylene tubing measuring 0.5 inch in diameter. The sub-main line 2 was pressurized at a range of about 20 psi to about 25 psi. The emitter 4 was set to create a continuously purging flow at 1.0 gal/hour.

Drip line 3 was connected to and secured to clean liquid outlet 60 with a clamp. Drip line 3 was polyethylene tubing measuring 0.25 inches in diameter, manufactured by Drip-Works. Clean stream 200 was delivered into drip line 3 and out of drip streams 201 to be dispensed to plants. Drip streams 201 was dispensed through button emitters, manufactured by Jain Irrigation. In this embodiment, there were 360 Jain button emitters (set at a flow rate of ½ gallon per hour) connected to drip line 3.

Liquid stream 100 was injected by the sub-main line 2 into inlet 50 at a flow rate of 3.0 gal/min. Liquid stream 100 contained silica sand weighing about 4.000 grams, and measuring between 58 microns and 75 microns. The clean stream 200 that was collected from clean liquid outlet 60 was ejected at a flow rate of 3.0 gal/min. The slurry stream 300 that was collected from slurry outlet 70 was ejected out of slurry outlet 70 at a flow rate of 1.0 gal/hr. The slurry stream contained silica sand weighing about 3.132 grams, and measuring between 58 microns and 75 microns.

Hydrocyclone 10 as described in the figures and specification of this patent application is effective at separating out 78.3% of particles measuring between 58 microns and 75 microns from liquid streams.

A number of embodiments of the invention have been described. Nevertheless, it will be understood that various modifications may be made without departing from the spirit and scope of the invention. Accordingly, other embodiments are within the scope of the present invention.

I claim:

1. A method of separating particles from a liquid stream and irrigating plants comprising:
    creating a hydrocyclone having an inlet, a separation section, a clean liquid outlet, and a slurry outlet, wherein the separation section has a vortex having a length and a cone having a length, and wherein the vortex length is longer than the cone length;
    wherein the vortex has a vortex arm having a length and a vortex base having a length, and wherein the ratio of the arm length to the base length is between about 2 and about 4;
    creating a pressure within the separation section;
    directing the stream of liquid containing particles into the inlet;
    ensuring the liquid stream is circulated through the separation section, wherein the liquid stream is separated into a clean stream and a slurry stream by the pressure;
    guiding the clean stream out of the clean liquid outlet, wherein the clean liquid outlet is connected to an irrigation dripline and the clean liquid is delivered to the dripline and to drip streams to irrigate plants; and
    disposing the slurry stream out of the slurry outlet, wherein the slurry outlet is connected to an emitter which removes the slurry stream as a continuous purging flow effective to create back pressure in the hydrocyclone thereby inhibiting clogging of the dripline during usage.

2. The method according to claim 1, wherein the separation section further comprises a clean liquid separation zone, and a slurry separation zone.

3. The method according to claim 1, wherein the vortex has a diameter and a length, and wherein the ratio of the vortex diameter to the vortex length is between about 0.8 and about 1.2.

4. The method according to claim 1, wherein the cone is angled between about 45 degrees and about 50 degrees.

5. The method according to claim 1, wherein the ratio of the cone length to the vortex length is between about 0.28 and about 0.35.

6. The method of claim 1, wherein the cone has a wide diameter, and wherein the ratio of the wide diameter to the cone length is between about 3.1 and about 3.2.

7. The method of claim 1, wherein the stream of liquid has a first particle amount, and wherein the clean stream has a second particle amount, and wherein the second particle amount is at least 78% less than the first particle amount.

8. The method of claim 1, wherein the irrigated plants are in a row.

* * * * *